United States Patent
Takeda et al.

(10) Patent No.: US 8,057,723 B2
(45) Date of Patent: Nov. 15, 2011

(54) METHOD OF MANUFACTURING INSERT-MOLDED ARTICLE AND APPARATUS THEREFOR

(75) Inventors: Takeshi Takeda, Hakusan (JP); Makoto Kitamura, Omihachiman (JP); Nihei Kaishita, Omihachiman (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 269 days.

(21) Appl. No.: 11/704,359

(22) Filed: Feb. 9, 2007

(65) Prior Publication Data
US 2007/0138697 A1 Jun. 21, 2007

Related U.S. Application Data

(63) Continuation of application No. PCT/JP2006/309895, filed on May 18, 2006.

(30) Foreign Application Priority Data

May 24, 2005 (JP) .................................. 2005-151440

(51) Int. Cl.
*B29C 45/14* (2006.01)

(52) U.S. Cl. ...................... 264/278; 264/279; 264/279.1; 264/272.11

(58) Field of Classification Search .................. 425/112, 425/317
See application file for complete search history.

(56) References Cited

U.S. PATENT DOCUMENTS

| 5,038,468 A | 8/1991 | Wanatowicz |
| 5,203,060 A | 4/1993 | Mraz et al. |
| 5,546,657 A * | 8/1996 | Mehta et al. .................... 29/884 |
| 6,919,644 B2 * | 7/2005 | Uchida ......................... 257/784 |
| 7,348,659 B2 * | 3/2008 | Amano et al. ................. 257/666 |

FOREIGN PATENT DOCUMENTS
DE 39 24 176 A1 2/1990
(Continued)

OTHER PUBLICATIONS

International Search Report (with English translation) from corresponding International application dated Aug. 1, 2006.
(Continued)

*Primary Examiner* — Joseph Del Sole
*Assistant Examiner* — Kimberly A Stewart
(74) *Attorney, Agent, or Firm* — Dickstein Shapiro LLP

(57) ABSTRACT

Provides is a method of manufacturing an insert-molded article enabling to perform resin molding and tie bar cutting in one step and so as not to expose the cut planes of the tie bars to the external surface of the resin. A lead frame 1 provided with easily breakable notches 3a at positions closer to the metal component than the interfaces of tie bars 3 to be resin molded is prepared and positioned by means of pilot pins 11 provided to a lower mold 10. A metal component 4 is sandwiched between support protrusions 13 and component fixing pins 24 by lowering an upper mold 20 with the lead frame being positioned. Tie bar cutting punches 23 provided to the upper mold 20 are pressed against the tie bars, the tie bars 3 are separated from the metal component 4 by breaking the notches 3a, and the surroundings of the metal component 4 are filled with resin while the molds are closed. By this, the cut surfaces between the metal component 4 and the tie bars 3 are buried in the molded resin 7.

9 Claims, 5 Drawing Sheets

FOREIGN PATENT DOCUMENTS

| | | | |
|---|---:|---|---|
| JP | 59136336 | * | 8/1984 |
| JP | 63-37211 | | 3/1988 |
| JP | 63-61129 | | 4/1988 |
| JP | 02-200410 | | 8/1990 |
| JP | 07-108543 | | 4/1995 |
| JP | 09213716 | * | 8/1997 |
| JP | 10135375 | * | 5/1998 |
| JP | 2000-289059 | | 10/2000 |
| WO | WO2006/126438 | | 11/2006 |

OTHER PUBLICATIONS

Written Opinion from corresponding International application dated Aug. 1, 2006.

Microfilm of the specification and drawings annexed to the request of Japanese Utility Model Application No. 129683/1986 (Laid-open No. 037211/1988) dated Mar. 10, 1988.

Microfilm of the specification and drawings annexed to the request of Japanese Utility Model Application No. 155032/1986 (Laid open No. 061129/1988) dated Apr. 22, 1988.

* cited by examiner

METHOD OF MANUFACTURING INSERT-MOLDED ARTICLE AND APPARATUS THEREFOR

CROSS REFERENCE TO RELATED APPLICATIONS

The present application is a continuation of International Application No. PCT/JP2006/309895, filed May 18, 2006, which claims priority to Japanese Patent Application No. JP2005-151440, filed May 24, 2005, the entire contents of each of these applications being incorporated herein by reference in their entirety.

TECHNICAL FIELD

The present invention relates to a method of manufacturing an insert-molded article for insert-molding resin around a metal component formed in a state being connected to a lead frame, and an apparatus therefor.

BACKGROUND ART

Conventionally, an insert-molded article, that is a resin molded metal component, have been widely used for a package for an electronic component, etc. The insert-molded article is usually manufactured by punching out the lead frame from a hoop material in a state where the metal component and a runner are connected by tie bars, setting the lead frame in a mold, injecting resin to resin-mold and the metal component, subsequently taking out the lead frame from the mold, and separating the insert-molded article from the lead frame by cutting the tie bars.

In the method of manufacturing an insert-molded article mentioned above, however, it is necessary for tie bars to be removed from the lead frame taken out from the mold by cutting in another process, and thereby, more working hours are required and a mold for a single purpose of being cut is required, thus resulting in increased equipment cost.

In order to address such a problem, a method of setting a lead frame in a forming mold, and cutting tie bars with cut means provided to the forming mold, while molding a metal component in the lead frame with resin at the same time, is proposed in Patent Document 1. Since, in this case, resin molding and tie bar cutting can be performed in a single process, not only working hours but also equipment cost can be decreased.

Patent Document 1: Japanese Unexamined Patent Application Publication No. 2000-289059

DISCLOSURE OF INVENTION

Problems to be Solved by the Invention

Since the method described in Patent Document 1 is performed by positioning of a metal component via tie bars by fixing the portions of a lead frame that are not filled with resin, the cut planes of the tie bars are always exposed to outside of the molded resin. Therefore, problems as described below occur.
(1) The circumference of the cut planes of the tie bars of the metal component are not insulated.
(2) Since the surroundings of the cut planes of the tie bars of the metal component are directly brought into contact with outside, the air-tightness of the metal component decreases.
(3) Since the cut planes of the tie bars of the metal component are not plated, the portion is brought into contact with outside air, and degradation due to oxidization occurs.

Accordingly, the object of a preferred embodiment of the present invention is to provide a method of manufacturing an insert-molded article, which can perform resin molding and tie bar cutting in a single process, and perform molding so that the cut planes of tie bars are not exposed to the external surface of resin.

Moreover, the object of another preferred embodiment of the present invention is to provide a manufacturing apparatus enabling one to perform the above method of manufacturing an insert-molded article.

Means for Solving Problems

A first preferred embodiment according to the present invention is a method of manufacturing an insert-molded article for molding resin around a metal component between a first and a second molds, including: a first step of preparing a lead frame in which the above metal component is supported by tie-bars, and easily breakable low-strength portions are provided at boundaries between each of the tie bars and the metal component and at positions closer to the metal component than the interfaces to be resin molded; a second step of positioning the lead frame by means of pilot pins provided to the first mold; a third step of holding the metal component by holding means provided to the first and second molds, by operating the first and second molds in a mold-clamping direction with the lead frame being positioned therein; a fourth step of separating the tie bars from the metal component by pressing tie bar cutting punches provided to the second mold against the tie bars to break the low-strength portions; and a fifth step of performing resin molding by injecting resin into a cavity surrounded by the tie bar cutting punches, the first and second molds being mold-clamped.

A second preferred embodiment according to the present invention is a manufacturing apparatus for manufacturing an insert-molded article for molding resin around a metal component using a lead frame in which the metal component is supported by tie bars, and low-strength portions are provided at boundaries between the tie bars and the metal components and at positions closer to the inside of the manufacturing apparatus than the interface to be resin molded, including: a first mold; a second mold for constituting a cavity between itself and the first mold; pilot pins provided to the first mold for positioning the lead frame; a holder provided to the first and second molds for holding the metal component; and tie bar cutting punches provided to the second mold for separating the tie bars from the metal component by pressing the tie bars in order to break the low-strength portions, and for constituting side walls of the cavity together with the first and second molds with being mold-clamped.

In the first embodiment of the present invention, a lead frame is first prepared, in which low-strength portions are provided in advance, at boundaries between each of the tie bars and the metal component and at positions closer to the metal component than the interfaces to be resin molded. The low-strength portions are portions that can connect a metal component to the lead frame until the lead frame is set in molds, and when the tie bar cutting punches press the tie bars, they can be easily broken to separate the tie bars and the metal component. Notches, slits, and the like may be provided at the boundary between each of the tie bars and the metal component. In addition, the metal component may be, for example, a terminal for mounting an electronic component element, a metal plate for shielding, and a metal plate for reinforcing.

Next, positioning of the lead frame is performed by means of pilot pins provided to the first mold. The positioning may be performed by forming pilot holes in the runners of the lead frame in advance and causing the pilot holes to be inserted by the pilot pins.

Next, the first and second molds are operated in a mold-clamping direction, the metal component is held by the holder provided to the first and second molds. The holding means have a function for holding the metal component so that it does not misalign even after, in the subsequent process, the low-strength portions are broken and the metal component is separated from the lead frame.

Next, mold bar cutting punches provided to the second mold are pressed the tie bars, the low-strength portions are broken, and then the tie bars are separated from the metal component. The low-strength portions are located at positions separated inside from the tie bar cutting punches, that are positions inside the interfaces of the resin when resin molding is performed.

Next, resin molding is performed by injecting resin into a cavity surrounded by the tie bar cutting punches and the first and second molds with being mold-clamped. In other words, the inner surfaces of the tie bar cutting punches constitute a part of the inner surfaces of the wall of the cavity. Since a gap exists between the inner surfaces of the tie bar cutting punches and the cut planes of the tie bars, the resin fills into the gap. As a result, the cut planes of the tie bars can be buried in the resin, and the cut planes of the tie bars of the metal component are not exposed to outside.

After that, by mold-opening the first and second molds, an insert molded article can be taken out from the molds.

According to another embodiment of the present invention, since the tie bar cutting punches are fixed to the second mold, it is preferable to separate the tie bars from the metal component utilizing the mold-clamping force of the first and second molds. Although the tie bar cutting punches can also be driven by a driving source other than that for the second mold, since a simple structure is obtained if the tie bar cutting punches are fixed to the second mold, and the tie bars can be separated from the metal component utilizing the mold-clamping force of the first and second molds.

According to another preferred embodiment, in the fourth step for separating the tie bars from the metal component using the tie bar cutting punches, a step of bending portions of the tie bars separated from the metal component, which are connected to the lead frame, using the tie bar cutting punches, should be included. Although, the tie bar cutting punches may cut the tie bars partially, debris may be generated and enter in the molds. By bending the portions of the tie bars after separated, they can be taken out from the molds together with the lead frame, thus resulting in no bebris.

According to further another preferred embodiment, the holding means should include support protrusions provided to the first mold, for supporting the metal component; and component fixing pins attached to the second mold via a biasing device, for pressing the metal component against the support protrusions in accordance with the mold-clamping operation of the first and second molds to hold it. As the means for holding, for example, pins may be provided to and protruded from the first mold, so that the metal component is held by inserting the pins into pin holes provided in the metal component. However, the metal component may float and bend when the tie bars are broken, and the metal component may also float due to the injection pressure during injection molding. On the contrary, if the both sides of the metal component are sandwiched by such holding means, the misalignment, the floating, and the bending etc. of the metal component can be more surely prevented.

As mentioned above, as for the insert-molded article manufactured by means of a method of the present invention, the cut surfaces between the metal component and each of the tie bars are buried in the molded resin. Therefore, the cut surfaces between the metal component and each of the tie bars can not utilized as external terminals. Therefore, an external terminal extending outward from the metal component and being exposed to the interface to be resin molded should be formed integrally on the metal component at a position other than those of joined portions between the metal component and the tie bars. Since, in the case, the external terminals can be formed on the metal component in advance at a stage of a lead frame, the end surfaces of the external terminals can be plated in advance. Accordingly, it is not necessary to plate the external terminals after resin molding. Further, when the external terminals are bent along the external surface of the molded resin, because of spring back, they hardly are in a state of close contact with the external surface of the molded resin. However, if at the stage of a lead frame, the external terminals are bent along the interface to be resin molded, the external terminals can be caused to be along the external surfaces of the molded resin in a state of close contact with the external surface.

Advantages

According to preferred embodiments of the present invention as described above, since resin molding and tie bar cutting can be performed in single step, working hours can be reduced and equipment cost can also be reduced. Moreover, since the cut surfaces of the tie bars of a metal component can be buried in resin, the circumference of the cut surfaces of the tie bars of a metal component can be insulated, and the airtightness at the periphery of the cut surfaces of the tie bars of the metal component is improved, thus enabling one to address the problem such as that the cut surfaces of the tie bars of the metal component are degraded due to oxidation thereof.

BEST MODE FOR CARRYING OUT THE INVENTION

Hereinafter, preferred embodiments of the present invention will be described with reference to examples.

Example 1

Figure 1:
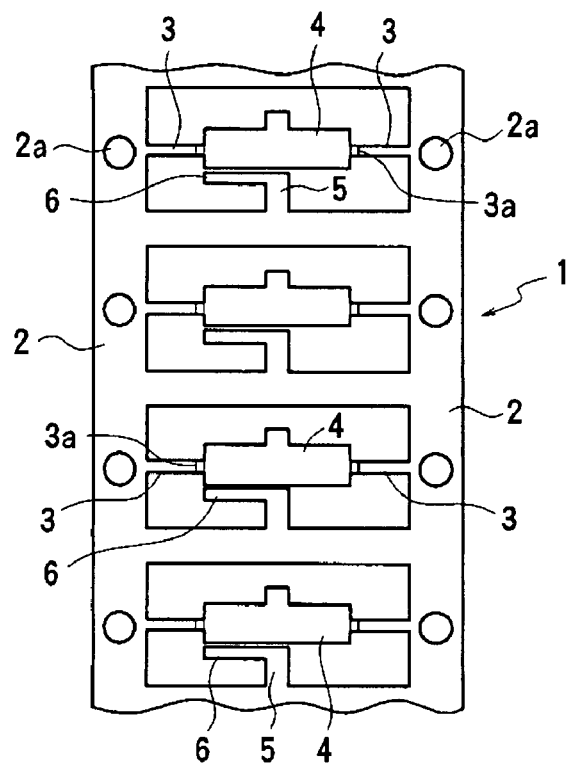
FIG. 1 is a plan view of one example of a lead frame according to the present invention.
Figure 2A:
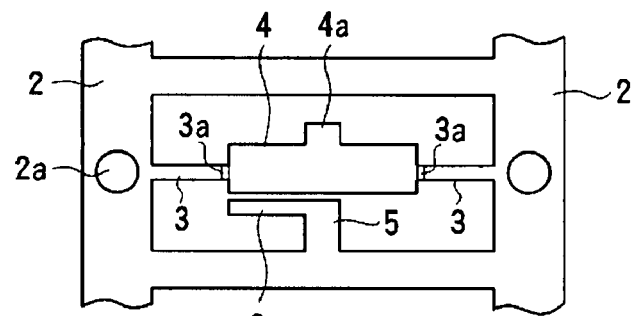
FIG. 2a is a partially enlarged view of the lead frame shown in FIG. 1.

In FIGS. 1 and 2, an example of a lead frame 1 used for the method of manufacturing an insert-molded article according to the present invention is shown. The lead frame 1 is formed by punching out a hoop material, where belt-like runners 2 are formed at the both sides thereof, and, between the runners 2, metal components 4 connected via tie bars 3 and external terminals 6 each connected via another tie bar 5, are formed. Pilot holes 2a are formed in the runners 2 at the same pitch intervals as those of the metal components 4. Each of the metal components 4 is connected to the runners 2 by two or more tie bars 3, and, at each boundary between each tie bar 3 and the metal component 4, a notch 3a, that is a low-strength portion, is formed (refer to FIG. 2a). The notches 3a, as described later, are located inside the interfaces of resin 7 after molding. In order to enable the tie bars to be easily broken, in place of the notches 3a, dotted-line shaped half-cuts and slits may be provided. A terminal 4a exposed to the external surface of the resin 7 is integrally formed on each of the metal components 4 at a position different from those of the tie bars 3.

Figure 2B:
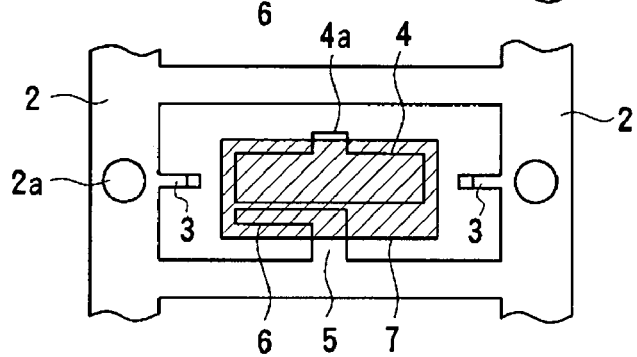
FIG. 2b is a partially enlarged view of the lead frame shown in FIG. 1 after insert-molded.
Figure 3:
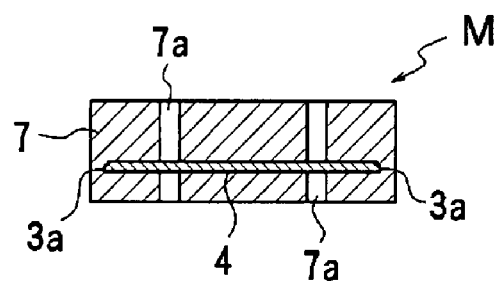
FIG. 3 is a schematic cross-sectional view of one example of an insert-molded article.

In FIG. 2b, a state where the resin has been molded with respect to the above lead frame 1, is shown. The metal component 4 and the external terminal 6 are insert-molded in the resin 7, the tie bars 3 connecting the runner 2 and the metal component 4 are separated; and the tie bar connecting the runner 2 and the external terminal 6 is still in the connecting state. After the lead frame 1 is filled with the resin 7, by cutting the tie bar 5, an insert-molded article M as shown in FIG. 3, is completed. When the insert-molded article M is used for a package of an electronic component, the metal component 4, may also be, for example, a shield plate. The cut portions 3a of the metal component 4 between itself and the tie bars 3, that are the parts where the notches 3a are formed, are buried in the resin 7 and not exposed to the outside. In addition, in the molded resin 7, a plurality of holes 7a are formed between the metal component 4 and the external surface of the molded resin 7, due to support protrusions 13 and component holding pins 24 described below.

Figure 4:
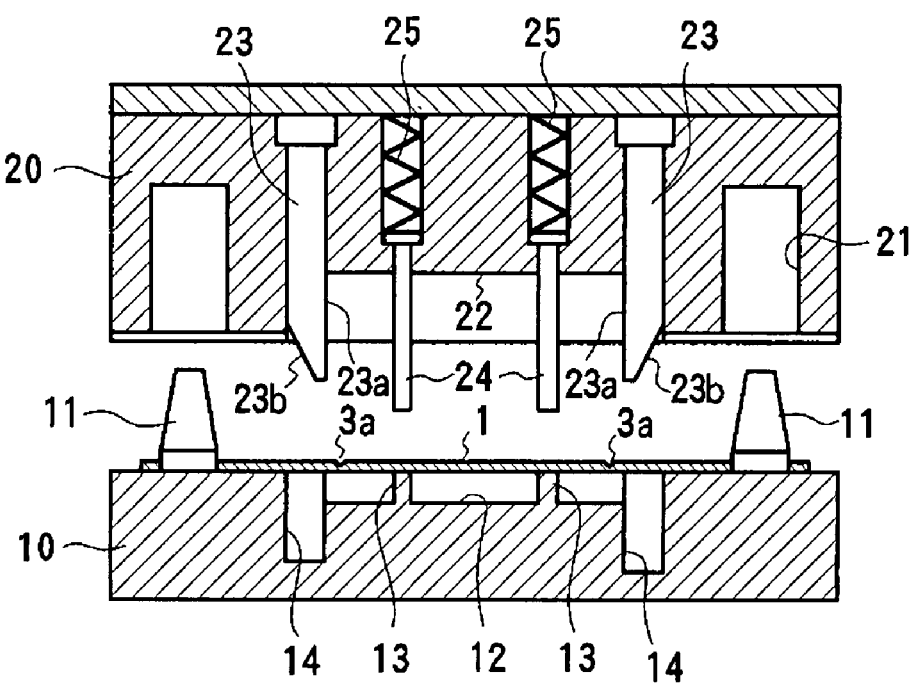
FIG. 4 is a cross-sectional view of one example of a manufacturing apparatus of an insert-molded article according to the present invention.

In FIG. 4, a manufacturing apparatus for manufacturing the insert-molded article M is shown. The manufacturing apparatus includes a lower mold 10 and an upper mold 20. In this example, the lower mold 10 is fixed at a predetermined position, and the upper mold 20 is driven upward and downward by a drive device, which is not shown in the figure. In the lower mold 10, pilot pins 11 to be inserted into the pilot holes 2a of the lead frame 1 for positioning the lead frame 1, are provided. In addition, a cavity 12, support protrusions 13 for supporting the metal component 4, and punch run-offs 14 neighboring the cavity 12, are provided in the lower mold 10.

In the upper mold 20, pin run-offs 21 are formed at locations corresponding to the pilot pins 11 and a cavity 22 is provided. Tie bar cutting punches 23 are fixed so as to be next to the cavity 22, and the lower ends of the tie bar cutting punches 23 protrude from the lower surface of the upper mold 20. The inner surface 23a of the tie bar cutting punch 23 is a vertical plane constituting a part of the inner wall surface of the cavity, and the external surfaces 23b of the punches 23 are inclined planes being inclined downward toward the inside of the manufacturing apparatus. At positions of the upper mold 20 facing the support protrusions 13 of the lower mold 10, a plurality of component fixing pins 24 protruding downward are attached and are freely movable upward and downward, with springs 25 for urging the pins 24 downward are provided to the upper mold 20.

Figure 5A:
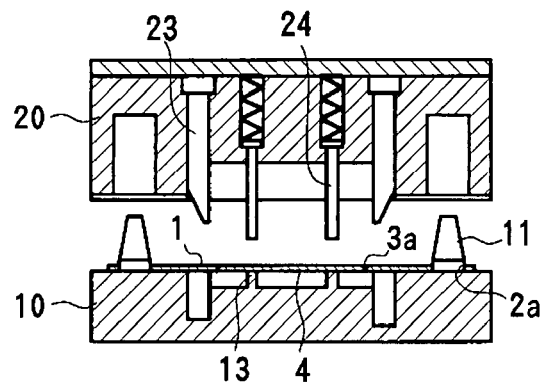
FIG. 5a to 5e constitute a flow chart using the manufacturing apparatus shown in FIG. 4.

Hereinafter, a method for manufacturing an insert-molded article M using the above manufacturing apparatus and the lead frame 1, will be described with reference to FIG. 5. In FIG. 5a, a state where the lead frame 1 is set on the lower mold 10 is shown. In other words, by inserting the pilot pins 11 of the lower mold 10 into the pilot holes 2a of the lead frame 1, the lead frame 1 is positioned at a predetermined location. The lower surface of the metal component 4 is supported by the support protrusions 13 of the lower mold 10, and the notches 3a provided to the lead frame 1 are located slightly closer to inside of the manufacturing apparatus than the inner surface 23a of the tie bar cutting punch 23, that is, the side of the metal component.

Figure 5B:
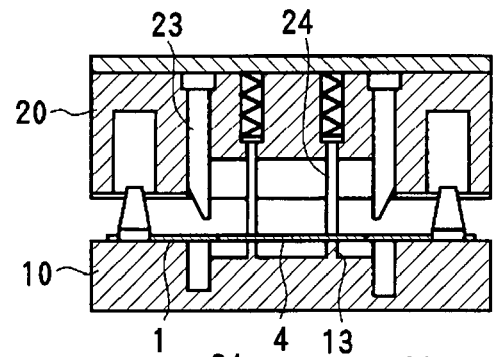

Next, as shown in FIG. 5b, the upper mold 20 is lowered. At this time, the component fixing pins 24 provided to the upper mold 20 press the metal component 4 against the support protrusions 13 to hold the metal component 4 stably in place. At that time, the tie bar cutting punches 23 are not brought into contact with the lead frame 1 yet.

Figure 5C:
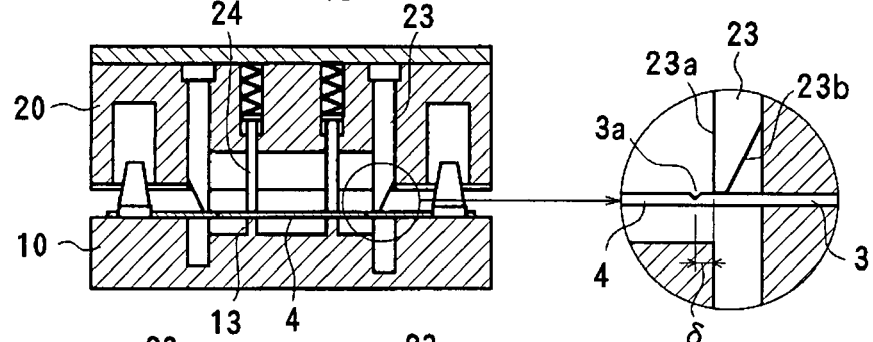

If the upper mold 20 is further lowered, as shown in FIG. 5c, the lower edges of the tie bar cutting punches 23 are brought into contact with the lead frame 1, in particular, the upper surfaces of the tie bars 3. At that time, the tie bar cutting punches 23 are brought into contact with the tie bars 3 at positions located outside the notches 3a by a distance δ.

Figure 5D:
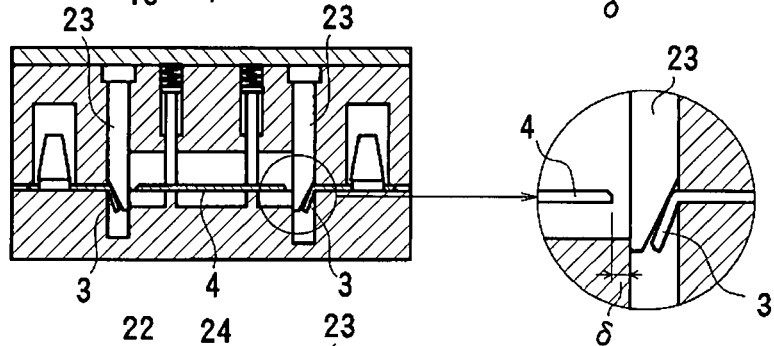

If the upper mold 20 is furthermore lowered, as shown in FIG. 5d, the tie bars 3 are pressed by the punches 23, and broken at the portions of the notches 3a. The broken tie bars 3 are bent downward so as to connect to the lead frame 1 on the inclined outer side surfaces 23b of the punches 23. After the tie bars 3 are broken, since the metal component 4 is sandwiched between the support protrusions 13 and the component fixing pins 24, positional misalignment hardly occurs.

Figure 5E:
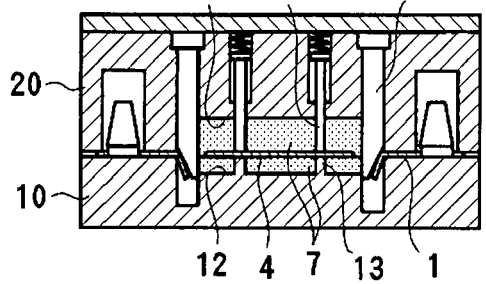

After that, as shown in FIG. 5e, by injecting resin in the cavities 12 and 22 with the upper mold 20 being mold-clamped with respect to the lower mold 10, insert-molding is performed. At that time, since the inner side surfaces 23a of the mold bar cutting punches 23 constitute a part of the inner wall surface of the cavities, and the inner side surfaces 23a are located at positions outside of the broken planes of the tie bars 3 by a distance δ, a part of the resin can cover the broken planes of the tie bars 3.

After the injection, the molds are opened by lifting the upper mold 20. In other words, first, the upper mold 20 is removed from the lower mold 10, next, the tie bar cutting punches 23 are removed from the lower mold 10, and finally, the component fixing pins 24 are removed from the metal plate 4. After the upper mold 20 is opened, the lead frame 1 is removed from the lower mold 10. At that time, since the external terminal 6 is connected to the lead frame 1 via the tie bar 5, and the external terminal 6 is buried in the resin 7, the insert-molded article M and the lead frame 1 are integrally taken out. After that, by cutting the tie bar 5 in another step, the insert-molded article M can be separated from the lead frame 1.

Example 2

Figure 6:
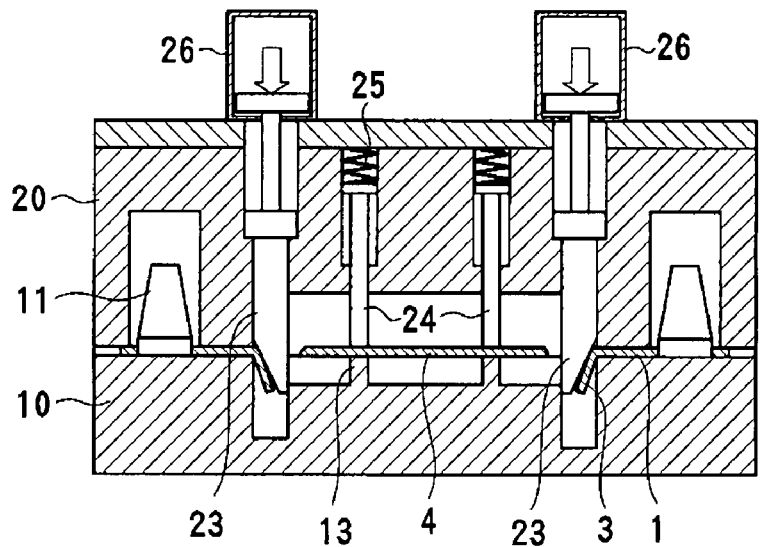
FIG. 6 is a cross-sectional view of another example of a manufacturing apparatus of an insert-molded article according to the present invention.

In FIG. 6, a second example of the manufacturing apparatus for manufacturing an insert-molded article M. The feature of the manufacturing apparatus is in that the tie bar cutting punches 23 are attached with respect to the upper mold 20 so as to be movable upward and downward, and actuators 26 for operating the tie bar cutting punches 23 upward and downward are provided to the upper mold 20. Since other configurations are similar to those of the first example, duplicated description will be eliminated by denoting same reference numerals.

In the first example, since the tie bar cutting punches 23 are fixed to the upper mold 20, the moving speed of the tie bar cutting punches 23 is equal to that of the upper mold 20. When the moving speed of the upper mold 20 is low, the moving speeds of the tie bars 3 are also low, and fracture of the notch 36 proceeds slowly, misalignment of the metal component 4 tends to occur. On the contrary, by separately providing actuators 26 for driving the tie bar cutting punches 23 as in the second example 2, since the tie bar cutting punches 23 can be operated at an optimum speed for fracture after performing mold-clamping, problems such as the misalignment of the metal component 4 can be addressed.

As the actuators 26, not only fluid pressure cylinders such as an air cylinder and a liquid pressure cylinder, shown in the figure, but also a cam mechanism, a spring mechanism, and an electromagnetic actuator, etc., can be used.

Example 3

Figure 7A:
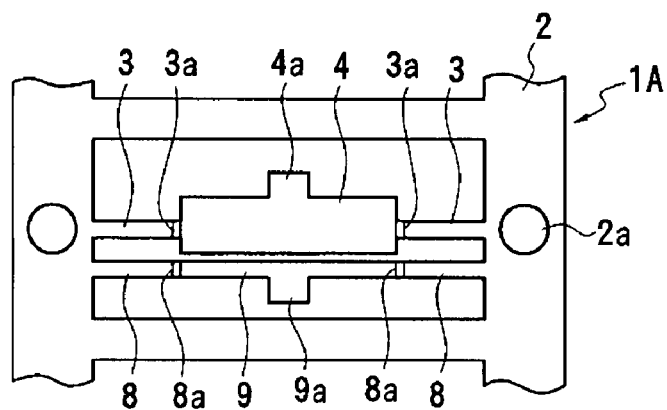
FIG. 7a and 7b are partially enlarged views of another example of a lead frame according to the present invention.

In FIG. 7, another example of a lead frame 1A is shown. As before, duplicated description will be eliminated by denoting same reference numerals. In this example, as shown in FIG. 7a, a first metal component 4 is formed in a state being connected to runners 2 of the lead frame 1A via two tie bars 3, and a second metal component 9 is formed in a state being connected to runners 2 of the lead frame 1A via two tie bars 8. At the boundaries between tie bars 3 and the first metal component 4, and between tie bars 8 and the second metal component 9, low-strength portions 3a and 8a such as notches are formed respectively. An external terminal 4a protruding outward is integrally formed on the first metal component 4 at a position different from those of the joined portions between the first metal component 4 and the tie bars 3, and an external terminal 9a protruding outward is integrally formed on the second metal component 9 at a position different from those of the connections between itself and the tie bars 8, are integrally formed on the first metal component 4 and second metal component 9, respectively.

Figure 7B:
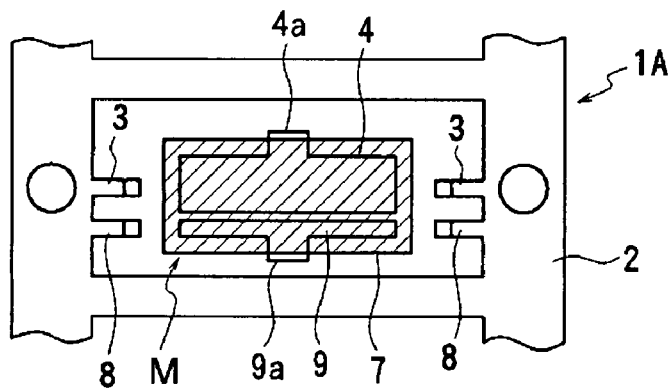

In FIG. 7b, a state where insert-molding is performed using the above lead frame 1A, is shown. As is clear from the figure, since, an insert-molded article M is already separated from the lead frame 1A at the stage of molding, it is not necessary to cut tie bars after molding.

The tips of the external terminals 4a and 9a may be formed in advance so as to protrude from the external surface of the resin 7 to be molded, or, as shown in 8(a), may be formed in advance so as to be flush with the external surface of the resin 7 to be molded. In either case, the edge faces of the tips of the external terminals 4a and 9a can be subjected to plating at a stage before molding, that is a stage of manufacturing the lead frame 1A. When the insert-molded article is a surface mounted component, since the external terminals 4a and 9a are subjected to plating, soldarability increases, and oxidation of the edge faces the terminals can also be prevented.

Figure 8A:
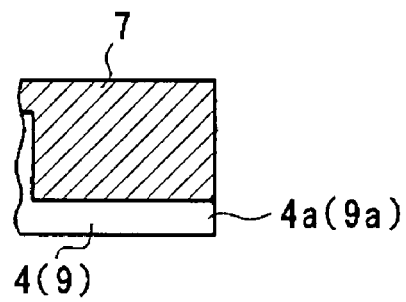
FIG. 8a and 8b are enlarged cross-sectional views of external terminal of an insert-molded article according to the present invention.
Figure 8B:
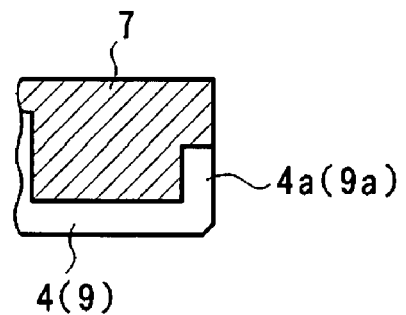

Moreover, as shown in FIG. 8a, in order to increase the soldering strength (fillet formation) of the external terminals 4a and 9a, the external terminals 4a and 9a may be caused to be along with the external surface of the resin 7 by subjecting the tips of the external terminals 4a and 9a to bending. Conventionally, when the external terminals are caused to be along with the external surface of the resin, they are required to be bent after insert-molding, but because of spring back, it has been difficult to cause the external terminals to be along the external surface of the resin in a state if being in close contact with the external surface. On the contrary, in the present examples, since the bending of the external terminals 4a and 9a can be performed in advance at a stage of manufacturing the lead frame 1A, that is a stage of before insert-molding, it is possible to cause the external terminals to be along with the external surface of the resin 7 in a state of close contact with the external surface without being affected by the spring back. In this case, since plating can be performed after bending (at a stage before molding), solderability is also good. The bending can result in a U-shaped terminal as shown in FIG. 8b.

In addition, in FIG. 8a, the external surfaces of the external terminals 4a and 9a were made to be flush with the external surface of the resin 7, however, this is not limited, rather the external surfaces of the external terminals 4a and 9a may protrude from the resin 7.

Example 4

Figure 9A:
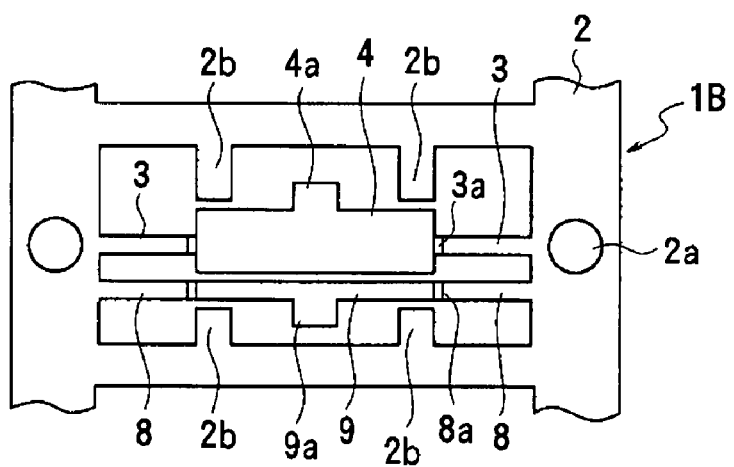
FIG. 9a and 9b are partially enlarged views of further another example of a lead frame according to the present invention.
Figure 9B:
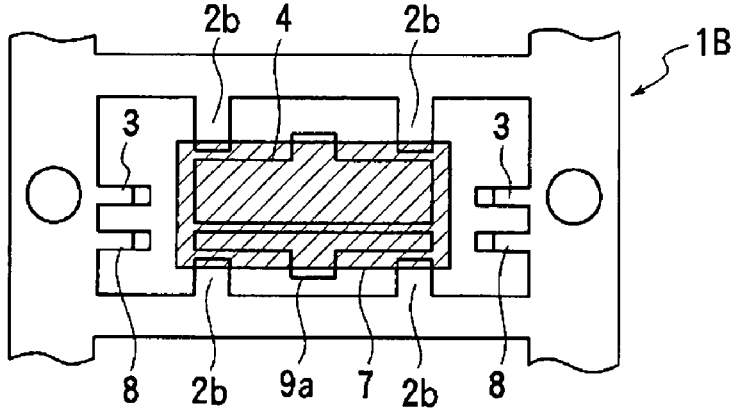

In FIG. 9, further another example of a lead frame 1B is shown. The lead frame 1B of this example is a modification of the lead frame 1A shown in FIG. 7, and the difference from the lead frame 1A is in that a plurality of protrusions 2b are formed from the runners 2 toward the inside, FIG. 9a, and, as shown in FIG. 9b, the tips of the protrusions 2b are inserted into the resin 7, thereby, the insert-molded article M can be supported. Since other constructions are similar to those in FIG. 7, by denoting same reference numerals to the same parts, duplicated description will be eliminated.

In this example, since the insert-molded article M is adhered to the lead frame 1B even after molding, it can be transferred to arbitrary processes in a state still being integrated with the lead frame 1B. After transferred the lead frame 1B to a separation step, by separating the protrusions 2b and the resin 7, the insert-molded article M can be separated without cutting the tie bars.

Although, examples such as a shield plate and an external terminal are shown as the metal component in the above examples, any component such as an internal connecting terminal or reinforcing core material can be applied. Accordingly, the shape of the metal component is not limited in any manner.

The insert-molded article M according to the present invention is not limited to a simple block shape as shown in FIG. 3, and any shape such as for example a shape of concave case with a bottom or a shape of cap, may be used.

Although in the above examples, an example where the first mold is a lower mold, and the second mold is an upper mold, is shown, this configuration is not limited, rather a configuration having two molds which are movable in horizontal direction, may be used. Further, any one of the first and second molds may be movable.

The invention claimed is:

1. A method of manufacturing an insert-molded article comprising providing a manufacturing apparatus containing a lead frame in which a metal component is supported by tie bars, the manufacturing apparatus comprising:
a first mold part;
a second mold part combined with the first mold part to define a cavity and being separatable from the first mold part;
pilot pins provided to the first mold for positioning the lead frame;

the lead frame with tie bars disposed in the cavity resting on the first mold part;

said tie bars having easily breakable low-strength portions which are notches or slits extending into the depth of the tie bars at the boundaries between the tie bars and the metal component, wherein the lead frame, metal component and tie bars have a common plane and the easily breakable low-strength portions extend perpendicularly to the common plane; and punches provided to the second mold for separating the tie bars from the metal component disposed to press against the tie bars in order to break the low-strength portions below the common plane to form a gap between the inner surfaces of the tie bar cutting punches and the cut planes of the tie bars, the punches being disposed so as to form the side walls of the cavity and the punches being disposed to be offset from the low-strength portions such that the innermost surface of the punches are further from the center of the apparatus than the low-strength portions, operating the tie bar cutting punches to break the low-strength portions below the common plane and separate the tie bars from the metal component, introducing molding resin around the metal component in the cavity such that the cut planes of the tie bars are buried in resin.

2. The method of manufacturing an insert-molded article according to claim 1, wherein the punches bend the portions of the tie bars separated from the metal component while the tie bars are still connected to the lead frame.

3. The method of manufacturing apparatus an insert-molded article according to claim 2, wherein the lead frame comprises:

support protrusions provided to the first mold for supporting the metal component: and component fixing pins provided to the second mold biased to hold the metal component by pressing the metal component against the support protrusions when the first and second molds parts are brought together.

4. The method of manufacturing apparatus an insert-molded article according to claim 3, wherein the punch configuration to bend portions of the tie bars comprises an inclined surface opposite a surface which forms a side wall of the cavity.

5. The method of manufacturing an insert-molded article according to claim 4, wherein the punches are fixed to the second mold part.

6. The method of manufacturing an insert-molded article according to claim 4, wherein the punches are movable relative to the second mold part and a driver causes movement of a punch.

7. The method of manufacturing an insert-molded article according to claim 1, wherein the punches are fixed to the second mold part.

8. The method of manufacturing an insert-molded article according to claim 1, wherein the punches are movable relative to the second mold part and a driver causes movement of a punch.

9. The method of manufacturing an insert-molded article according to claim 2, wherein the punch configuration to bend portions of the tie bars comprises an inclined surface opposite a surface which forms a side wall of the cavity.

* * * * *